United States Patent [19]

Crosby

[11] Patent Number: 4,960,606
[45] Date of Patent: * Oct. 2, 1990

[54] MICROBIALLY-STABLE SHORTENING CONTAINING BUTTER

[75] Inventor: Thomas G. Crosby, Bourbonnais, Ill.

[73] Assignee: Bunge Foods Corporation, Bradley, Ill.

[*] Notice: The portion of the term of this patent subsequent to Oct. 9, 2007 has been disclaimed.

[21] Appl. No.: 216,111

[22] Filed: Jul. 7, 1988

[51] Int. Cl.$^5$ ..................... A23C 15/12; A23D 7/00; A23D 9/00

[52] U.S. Cl. ..................... 426/602; 426/603; 426/606; 426/607; 426/608; 426/613; 426/610

[58] Field of Search ............... 426/602, 606, 607, 608, 426/603, 613, 610

[56] References Cited

U.S. PATENT DOCUMENTS

| | | | |
|---|---|---|---|
| 2,875,065 | 2/1959 | Thompson | 426/606 |
| 2,999,022 | 9/1961 | Payne et al. | 426/606 |
| 3,338,720 | 8/1967 | Pichel . | |
| 3,397,998 | 8/1968 | Fricks . | |
| 3,443,966 | 5/1969 | Reid . | |
| 3,682,656 | 8/1972 | Wilton et al. . | |
| 3,796,815 | 3/1974 | Lincklaen et al. . | |
| 4,160,850 | 7/1979 | Hallstrom et al. . | |
| 4,292,333 | 9/1981 | Bosco et al. . | |
| 4,359,482 | 11/1982 | Crosby . | |
| 4,375,483 | 3/1983 | Shuford et al. . | |
| 4,384,008 | 5/1983 | Millisor . | |
| 4,385,076 | 5/1983 | Crosby . | |

FOREIGN PATENT DOCUMENTS 7115372 7/1972 Netherlands .
1355967 6/1974 United Kingdom .

OTHER PUBLICATIONS

Rico-Munoz and Davidson, "Effect of Corn Oil and Casein on the Antimicrobial Activity of Phenolic Antioxidants," *Journal of Food Science*, vol. 48:4, Jul.-Aug., 1983.
Verrips, Smid and Kerkhof, "The Intrinsic Microbial Stability of Water-in-Oil Emulsions," *European Journal of Applied Microbiology and Biotechnology*, vol. 10, pp. 73-85, 1980.
Verrips and Zaalberg, "The Intrinsic Microbial Stability of Water-in-Oil Emulsins", *European Journal of Applied Microbiology and Biotechnology*, vol. 10, pp. 187-196, 1980.
Andres, Ed., "Flavor and Functional Attributes of Butter Available in Easy-to-Use Liquid Form," *Food Processing*, p. 76, Jun. 1983.

*Primary Examiner*—Marianne Cintins
*Attorney, Agent, or Firm*—Lockwood, Alex, Fitzgibbon & Cummings

[57] ABSTRACT

Shortening compositions containing one or more dairy components are provided in a form in which they are shelf-stable to the extent that they can be stored at room temperatures for extended periods of time. These compositions can be formulated so as to be pourable, and they contain up to about 20 weight percent or more of a butter component such as whole, real butter, together with relatively low levels of water and supersaturated levels of salt or the like. The shortening compositions exhibit a taste profile that is exceptionally close to that of real, whole butter, particularly when compared with products that do not include any real dairy components.

13 Claims, No Drawings

MICROBIALLY-STABLE SHORTENING CONTAINING BUTTER

BACKGROUND AND DESCRIPTION OF THE INVENTION

The present invention generally relates to shortening compositions that contain whole butter or the like and that are microbially stable at room temperatures. More particularly, the shelf-stable shortening compositions according to this invention contain enough butter or the like so as to provide an exceptionally close match for the taste of butter, and the compositions are formulated so as to provide a system that is shelf-stable and that does not require refrigeration. Preferably, the compositions are also pourable at room temperatures. The shelf-stable compositions contain a relatively low level of water that is supersaturated with a salt component and/or a preservative component.

Shortening products that are easy to handle and convenient to store have been developed over the years in an effort to provide substitutes for butter or margarine that are more convenient to use and store and that are less expensive and have lower cholesterol levels than whole, real butter. Often such products are formulated so as to be pourable, and they also often respond to the objective of being stable both from a microbiological standpoint and from the standpoint of being stable against phase separation. Typically, these types of products are non-dairy compositions, which greatly simplifies problems associated with stability, especially the problem of maintaining microbiological stability of a non-refrigerated product.

These types of non-dairy products, whether they are pourable or not, do not provide an entirely satisfactory butter flavor and taste. No real butter is included and, therefore, artificial and/or natural butter flavorings are used in order to attempt to approximate the taste and flavor of real whole butter. Accordingly, products have been developed that incorporate real whole butter with margarine formulations in order to arrive at a product that more closely resembles real whole butter. These products typically require refrigeration in order to achieve acceptable microbiological stability, and these products are typically ones that are not pourable, but they are in stick form, or are non-pourable plastic compositions that are distributed in tins, tubs or other wide-mouthed containers.

Accordingly, there is a need for shortening products that include real dairy components in a manner such that the flavor of these products more closely approximates that of real whole butter and that do not rely exclusively upon artificial butter flavorings in order to attempt to achieve this result. It is furthermore especially desirable that such products be of the type that exhibit acceptable shelf stability even when stored under non-refrigerated conditions. A particularly difficult problem in this regard is to maintain stability against microbial growth even under room temperature storage conditions. For convenience of use purposes, particularly in connection with cooking objectives, it is especially desirable to have such products exhibit a pourable consistency under at least room temperature conditions, as opposed to product consistencies that are of a plastic or spreadable nature.

By the present invention, not only are shortening compositions provided which contain real whole butter or the like, but also they exhibit shelf stability, including microbiological stability under refrigerated or non-refrigerated conditions. It is also possible, if desired, to formulate such shortening compositions which are pourable at least at room temperature. An edible liquid base shortening component comprises a majority of the shortening compositions according to this invention, which further include up to as much as about 20 weight percent or more of real whole butter and/or butter substitutes containing significant quantities of dairy ingredients, together with not more than about 10 weight percent of water in combination with a salt and/or preservative that is in an excess amount relative to its solubility in the quantity of water present in the shortening composition.

It is accordingly a general object of the present invention to provide an improved shelf-stable shortening composition that contains real whole butter.

Another object of this invention is to provide an improved shortening composition that is formulated with real butter or the like and that provides a close match for the taste of 100% whole, real butter.

Another object of the present invention is to provide an improved shelf-stable shortening composition that includes a dairy component while being microbiologically stable even when stored under non-refrigerated conditions.

Another object of the present invention is to provide an improved shelf-stable shortening composition that is both shelf-stable and pourable at room temperature conditions.

Another object of this invention is to provide an improved shelf-stable shortening composition containing butter which is pourable and which does not have to be refrigerated.

Another object of this invention is to provide an improved shelf-stable shortening composition that more closely approximates the flavor and taste of butter than do other shortening compositions that do not include any appreciable amounts of real whole butter or the like.

Another object of the present invention is to provide an improved butter-containing shortening composition that includes low levels of water supersaturated or at least saturated with salt and/or other preservative components.

These and other objects, features and advantages of this invention will be clearly understood through a consideration of the following detailed description.

DESCRIPTION OF THE PARTICULAR EMBODIMENTS

Shortening compositions according to this invention include an edible liquid shortening base component that comprises well in excess of half of the shortening composition on a weight percent basis, such being typically at least about 70 weight percent of the shortening composition. The shortening composition further includes in excess of about 1 weight percent of a butter component, and typically less than about 20 weight percent, of the shortening composition. The preferred butter component is whole butter. Butter substitutes containing substantial amounts of dairy components can be included in the butter component. Low levels of water are also included, usually at not more than about 10 weight percent of the composition. An excess amount of salt and/or other preservative is also included within the shortening composition. Other components will typically be included such as emulsifiers, anti-foaming agents, coloring agents, additional protein sources, artificial flavors and the like.

The edible liquid shortening component provides the edible oil base for the shortening composition. This liquid base shortening component should be sufficiently low in solids so as to facilitate the maintenance of a fluid or pourable shortening composition product. Exemplary liquid base shortening components in this regard are those which include pourable vegetable oils such as soybean oil, corn oil, rapeseed or canola oil, sunflower oil, safflower oil, olive oil, cottonseed oil and the like. The liquid base shortening component can, if desired, also include a minor amount of a hard fat material or solids component such as soy flake or other non-pourable forms of soybean, rapeseed, corn and the like, typically only those which form beta crystals. Such solids component, when present, should comprise a relatively low percentage of the liquid base shortening component, typically not more than about 12 weight percent of the complete shortening composition, preferably less than 8 weight percent and most preferably about 6 weight percent or less of the liquid base shortening component.

These liquid base shortening components will comprise as low as 70 weight percent or less of the shelf-stable dairy material-containing shortening composition and could comprise as much as approximately 98 weight percent thereof. The preferred range is between about 75 and about 95 weight percent of the complete shortening composition, most preferably between about 78 and 88 weight percent.

An especially advantageous feature of the shelf-stable shortening composition according to the present invention is the inclusion of a significant quantity of a butter component that preferably is or includes whole butter or real dairy butter. The amount of the butter component included within the composition will typically be well in excess of 1 weight percent of the shortening composition, especially if no other sources of protein or nitrogen are included within the composition. As much as 20 weight percent of the butter component could be included, with the typically preferred range of the butter component being between about 5 and about 15 weight percent butter, most preferably between about 7 and about 12 weight percent.

If butter components other than whole butter are included, they may be referred to as butter substitutes or margarines which include a significant amount of dairy ingredients such as milk solids or other dairy sources of protein or nitrogen which provide nutrients for undesired microbial growth. A typical butter substitute would have a milk solids content in the general range of 1 to 5 percent.

The shortening compositions according to the present invention include only very low levels of water. The water is present in combination with a salt and/or some other preservative at a level at or in excess of the saturation level. This combination of water and salt or the like is of assistance in providing a product which has shelf stability under non-refrigerated conditions even though the product or composition includes water as well as nitrogen-containing or protein-containing dairy components. The low level of water will typically be not greater than, and preferably significantly less than 10 weight percent of the shortening composition, preferably in an amount of between about 2 and about 8 weight percent, and most preferably between about 4 and about 6 weight percent.

Exemplary salts that are included within the shortening composition will typically be those that enhance the taste of the shortening composition while also assisting in maintaining its stability even when stored under non-refrigerated conditions. Inorganic salts, organic salts and treated salts may be used. Sodium chloride, calcium chloride, potassium chloride, sea salt, monosodium glutamate and treated salts may be used, either alone or in combination. An example of a treated salt is sodium chloride treated with calcium disodium ethylenediaminetetraacetic acid salt, which is additionally useful to chelate any active, pro-oxidant, heavy metal that may find its way into the shortening composition. Depending upon the particular salt, the shortening composition according to the invention may include greater than about 0.15 and not more than about 4 weight percent thereof. The salts should be added such that the shortening composition has an available water level ($A_w$) of between approximately 0.56 and 0.85, preferably between approximately 0.6 and 0.8, most preferably between approximately 0.68 and 0.76.

Other materials can also be used that lower the available water level. Sugars, starches, and combinations thereof with salts could be used if consistent with the flavoring and microbial stability needs and objectives of the particular shortening composition.

Preservatives in addition to salts may also be included. Well-known preservatives in this regard include sodium benzoate, potassium sorbate and the like. In addition, these preservatives can function as mold inhibitors and can also, due to their transformation into acidic form such as sorbic acid or benzoic acid or the like, assist in maintaining a formulation having excess salt by virtue of the pH lowering effect of such edible acids. When these types of additional preservatives are added, they may be included at levels as high as about 1 weight percent, and they will typically be present at levels no lower than about 0.01 weight percent. The preservative and salt are present at levels so as to meet or exceed the solubility product thereof and be at or in excess of saturation at ambient temperature.

Closely associated components are those which may be characterized as antioxidants. Some known antioxidants that are useful in this regard include butylated hydroxyanisole (BHA), butylated hydroxytoluene (BHT), tertiary butyl hydroquinone (TBHQ), propyl gallate, and the tocopherols including alpha-tocopherol or vitamin E. These preservatives, salts or antioxidants can furthermore be used in combination with an edible organic acid such as citric acid or the like. The edible organic acids present in the shortening composition, whether added to the composition as an acid or formed from organic salt preservatives within the composition, are useful in adjusting the pH if desired in order to assist in blending components of the shortening composition and in order to aid in maintaining the shelf stability of the shortening composition. A typical shortening composition according to this invention will have a pH within the range of between about 5 and about 6.8.

Preferably, the shortening compositions will include an emulsifier. Emulsifiers such as lecithin, as well as monoglycerides and diglycerides, can be included at customary, as needed levels, typically between approximately 0.5 and about 2 weight percent. Lecithin is also known to impart anti-sticking properties to the shortening composition when it is used. It is also preferred to include anti-foaming agents such as dimethylpolysiloxane (DMPS) which are useful in improving the handling of properties of the shortening composition, particularly during the blending thereof. The anti-foaming agent is added at amounts as needed and can be between about 0.0001 and about 0.001 weight percent. Coloring agents such as beta-carotene can also be included at customary levels in order to impart a yellow type of color to the shortening composition. For example, between about 0.001 and 0.01 weight percent of a thirty percent beta-carotene component may be included. Artificial and/or natural butter flavors could also be added when desired. These can further enhance the close match of the shortening compositions to the taste and flavor of real butter. These flavoring components are known in the art and may be included at typical amounts such as 0.005 to about 0.2 weight percent or until a desired degree of flavor enhancement is achieved.

When there is a desire to do so, a source of protein or nitrogen that is in addition to that provided by the butter component of the shortening composition can be included. Such nitrogen sources include dairy components such as non-fat dry milk solids, other milk materials, cream, whey and the like. When these are included, they must necessarily be kept at relatively low percentages, depending somewhat on the percentage of other dairy components present in the formulation, in order to minimize the risk of creating microbiological stability problems.

The shortening compositions are made by standard procedures used for manufacturing edible oil products. Such procedures effect a blending of the various desired components together, which typically can include running them through a pumping apparatus and into a scraped wall heat exchanger, or wiped film evaporator. Ease of blending can be facilitated by making additions in a specific order which will be generally understood in the art.

A pourable shelf-stable shortening composition in accordance with this invention was subjected to taste testing in order to compare its taste with that of butter. A commercial non-dairy pourable shortening was similarly tested. The results indicated that the product according to the present invention had a taste not different from butter, while the taste of the non-dairy pourable product was significantly different from butter.

Compositions formulated according to the present invention were subjected to microbiological testing in order to study the growth and survival of selected microorganisms therein. Details in this regard are provided in the following Example 1 through Example 9.

EXAMPLE 1

A flowable product containing no butter or butter substitute containing dairy ingredients was prepared and subjected to microbiological testing. As such, this product testing represented a control illustrating the type of microbiological properties that are typical of a pourable shortening product that does not contain any dairy component such as butter. The formulation was as follows:

92.748 weight percent of a shortening composed primarily of soybean oil;
0.500 weight percent lecithin;
0.002 weight percent beta-carotene;
1.500 weight percent salt;
0.100 weight percent potassium sorbate;
5.000 weight percent water; and
0.150 weight percent flavors.

Separate samples of this control shortening formulation were inoculated with various organisms and counts were taken periodically. This procedure was conducted at three different temperatures, with storage at 4° C. representing refrigerated storage, storage at 25° C. representing unrefrigerated or room temperature storage, and 35° C. representing abusive storage conditions. The test organisms included *Staphylococcus aureus* (5 strains—composited), Salmonella species (5 species—composited), *Clostridium perfringens* (5 strains—composited), *Bacillus cereus* (5 strains—composited), *Escherichia coli* (5 strains—composited), Pseudomonads (composite of *Pseudomonas putrefaciens, Pseudomonas fragi, Pseudomonas mephitica* and *Aeromonas hydrophilia*), Yeasts (composite of *Saccharomyces bailii*, a Rhodtorula isolate from butter, and *Candida tropicalis*), and Molds (Penicillium, Alternaria and Aspergillus species, isolated from butter and margarine products). The results of this testing are specified Table I. Data reported in this and other tables herein which are followed by "R" indicate that these are repeat data generated from retesting of results that appeared to be aberrations caused by unrepresentative samples due primarily to non-uniform test samples.

Samples inoculated with *Staphylococcus aureus, Clostridium perfringens* and *Bacillus cereus* were analyzed by methods described for each organism in the Bacteriological Analytical Manual of the Food and Drug Administration, published by the Association of Official Analytical Chemists in 1978. Samples inoculated with Pseudomonads, Yeasts or Molds were analyzed by the methods specified in the Bacteriological Analytical Manual for determining aerobic plate count and yeast and mold count, respectively. Samples inoculated with the Salmonella species were analyzed by surface plating onto Hektoen Enteric Agar, incubated at 35° C. for 48 hours.

TABLE I

| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
|---|---|---|---|---|---|---|---|---|---|
| 0 | 35° | 1,000,000 | 19,000 | 20 | 110,000 | 7,000 | 12,000 | 46,000 | 11,000 |
| 1 | 35° | <10 | <10 | <10 | 70,000 | 90 | 610 | <10 | 750 |
| 2 | 35° | 20 | <10 | <10 | 70,000 | <10 | 50 | <10 | 110 |
| 3 | 35° | <10 | <10 | <10 | 240,000 | <10 | <10 | 50 | 50 |
| 5 | 35° | <10 | <10 | <10 | 85,000 | <10 | <10 | <10 | <10 |
| 7 | 35° | <10 | <10 | <10 | 35,000 | <10 | <10 | <10 | <10 |
| 10 | 35° | <10 | <10 | <10 | 59,000 | <10 | <10 | <10 | <10 |
| 0 | 25° | 1,000,000 | 19,000 | 20 | 110,000 | 7,000 | 12,000 | 46,000 | 11,000 |

TABLE I-continued

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 3 | 25° | <10 | <10 | <10 | 58,000 | <10 | 160 | <10 | 3,000 |
| 5 | 25° | <10 | <10 | <10 | 73,000 | <10 | <10 | <10 | <10 |
| 10 | 25° | <10 | <10 | <10 | 70,000 | <10 | 10 | <10 | <10 |
| 20 | 25° | <10 | <10 | <10 | 33,000 | <10 | <10 | <10 | <10 |
| 30 | 25° | <10 | <10 | <10 | 87,000 | <10 | <10 | <10 | <10 |
| 60 | 25° | <10 | <10 | <10 | <10 | <10 | <10 | <10 | <10 |
| 90 | 25° | <10 | <10 | <10 | <10 | <10 | <10 | <10 | <10 |
| 180 | 25° | <10 | <10 | <10 | <10 | <10 | 540 (<10 R) | <10 | <10 |
| 0 | 4° | 1,000,000 | 19,000 | 20 | 110,000 | 7,000 | 12,000 | 46,000 | 11,000 |
| 30 | 4° | <10 | <10 | <10 | 110,000 | <10 | 80 | <10 | <10 |
| 90 | 4° | <10 | <10 | <10 | 160,000 | <10 | <10 | <10 | <10 |
| 180 | 4° | <10 | <10 | <10 | 62,000 | <10 | <10 | <10 | <10 |

Samples of the non-dairy control shortening composition of this Example 1 were subjected to further testing in order to provide further control data. These control samples were uninoculated. The total number of the various groups of microorganisms that were present at various storage times and at the three storage temperatures are reported in Table II. These uninoculated samples were analyzed for each group of organisms by the procedures specified herein in conjunction with the Table I data. In Table II, "ND" signifies that the particular microorganism was not detected.

TABLE II

| | | Microorganisms Detected | | | | | | |
|---|---|---|---|---|---|---|---|---|
| Storage Time (Days) | Temp. (°C.) | S. aureus (c/g) | Salmonella species (c/100 g) | E. coli (c/g) | Aerobic Plate Count (c/g) | C. perfringens (c/g) | B. cereus (c/g) | Yeasts (c/g) | Molds (c/g) |
| 0 | 35° | <10 | ND | <10 | <10 | <10 | <10 | <10 | <10 |
| 1 | 35° | <10 | ND | <10 | <10 | <10 | <10 | <10 | <10 |
| 2 | 35° | <10 | ND | <10 | <10 | <10 | <10 | <10 | <10 |
| 3 | 35° | <10 | ND | <10 | <10 | <10 | <10 | <10 | <10 |
| 5 | 35° | <10 | ND | <10 | <10 | <10 | <10 | <10 | <10 |
| 7 | 35° | <10 | ND | <10 | <10 | <10 | <10 | <10 | <10 |
| 10 | 35° | <10 | ND | <10 | <10 | <10 | <10 | <10 | <10 |
| 0 | 25° | <10 | ND | <10 | <10 | <10 | <10 | <10 | <10 |
| 3 | 25° | <10 | ND | <10 | <10 | <10 | <10 | <10 | <10 |
| 5 | 25° | <10 | ND | <10 | <10 | <10 | <10 | <10 | <10 |
| 10 | 25° | <10 | ND | <10 | <10 | <10 | <10 | <10 | <10 |
| 20 | 25° | <10 | ND | <10 | <10 | <10 | <10 | <10 | <10 |
| 30 | 25° | <10 | ND | <10 | <10 | <10 | <10 | <10 | <10 |
| 60 | 25° | <10 | ND | <10 | <10 | <10 | <10 | <10 | <10 |
| 90 | 25° | <10 | ND | <10 | <10 | <10 | <10 | <10 | <10 |
| 180 | 25° | <10 | ND | <10 | <10 | <10 | <10 | <10 | <10 |
| 0 | 4° | <10 | ND | <10 | <10 | <10 | <10 | <10 | <10 |
| 30 | 4° | <10 | ND | <10 | <10 | <10 | <10 | <10 | <10 |
| 60 | 4° | <10 | ND | <10 | <10 | <10 | <10 | <10 | <10 |
| 90 | 4° | <10 | ND | <10 | <10 | <10 | <10 | <10 | <10 |

EXAMPLE 2

The non dairy shortening formulation of Example 1 was treated in a manner that would simulate especially harsh handling conditions in order to present the worst possible case for microorganism growth. This case is one in which the aqueous phase is separated from the oil phase of the shortening product. This aqueous phase sample was prepared by heating the non-dairy shortening product of Example 1 to 131° C. for 12 hours, followed by centrifuging and collection of the aqueous phase component. The aqueous phases were collected and recentrifuged to remove any excess particulate. Samples of this so-called aqueous formulation were then inoculated in the manner specified in Example 1. The results thereof are reported in Table III.

TABLE III

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 0 | 35° | 6,100,000 | 8,600,000 | 20 | 78,000 | 12,000 | 4,000 | 23,000 | 21,000 |
| 1 | 35° | 20 | <10 | <10 | 110,000 | 1,200 | 1,700 | <10 | <10 |
| 2 | 35° | 40 | <10 | <10 | 110,000 | 550 | 930 | <10 | <10 |
| 3 | 35° | <10 | <10 | <10 | 92,000 | 90 | 870 | <10 | <10 |
| 5 | 35° | <10 | <10 | <10 | 130,000 | <10 | 310 | <10 | <10 |
| 7 | 35° | <10 | <10 | <10 | 110,000 | <10 | 60 | <10 | <10 |

TABLE III-continued

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 10 | 35° | <10 | <10 | <10 | 110,000 | <10 | <10 | <10 | <10 |
| 0 | 25° | 6,100,000 | 8,600,000 | 20 | 78,000 | 12,000 | 4,000 | 23,000 | 21,000 |
| 3 | 25° | <10 | <10 | <10 | 89,000 | 910 | 1,300 | <10 | <10 |
| 5 | 25° | <10 | <10 | <10 | 90,000 | <10 | 1,900 | <10 | <10 |
| 10 | 25° | <10 | <10 | <10 | 78,000 | <10 | 240 | <10 | <10 |
| 20 | 25° | <10 | <10 | <10 | 110,000 | <10 | <10 | <10 | <10 |
| 30 | 25° | <10 | <10 | <10 | 140,000 | <10 | <10 | <10 | <10 |
| 60 | 25° | <10 | <10 | <10 | 79,000 | <10 | <10 | <10 | <10 |
| 90 | 25° | <10 | <10 | <10 | 80 | <10 | <10 | <10 | <10 |
| 180 | 25° | <10 | <10 | <10 | 60 | <10 | <10 | <10 | <10 |
| 0 | 4° | 6,100,000 | 8,600,000 | 20 | 78,000 | 12,000 | 4,000 | 23,000 | 21,000 |
| 30 | 4° | <10 | <10 | <10 | 120,000 | <10 | 17,000 | <10 | <10 |
| 90 | 4° | <10 | <10 | <10 | 76,000 | <10 | 690 | <10 | <10 |
| 180 | 4° | <10 | <10 | <10 | 290,000 (85,000 R) | <10 | 690 | <10 | <10 |

Additional samples of the aqueous material of this Example 2 were studied over time and under different temperature conditions. These samples were not inoculated, and data were collected in the manner of that of Table II of Example 1. These data are reported in Table IV.

TABLE IV

| | | Microorganisms Detected | | | | | | |
|---|---|---|---|---|---|---|---|---|
| Storage Time (Days) | Temp. (°C.) | S. aureus (c/g) | Salmonella species (c/100 g) | E. coli (c/g) | Aerobic Plate Count (c/g) | C. perfringens (c/g) | B. cereus (c/g) | Yeasts (c/g) | Molds (c/g) |
| 0 | 35° | <10 | ND | <10 | <10 | <10 | <10 | <10 | <10 |
| 1 | 35° | <10 | ND | <10 | <10 | <10 | <10 | <10 | <10 |
| 2 | 35° | <10 | ND | <10 | <10 | <10 | <10 | <10 | <10 |
| 3 | 35° | <10 | ND | <10 | <10 | <10 | <10 | <10 | <10 |
| 5 | 35° | <10 | ND | <10 | <10 | <10 | <10 | <10 | <10 |
| 7 | 35° | <10 | ND | <10 | <10 | <10 | <10 | <10 | <10 |
| 10 | 35° | <10 | ND | <10 | <10 | <10 | <10 | <10 | <10 |
| 0 | 25° | <10 | ND | <10 | <10 | <10 | <10 | <10 | <10 |
| 3 | 25° | <10 | ND | <10 | <10 | <10 | <10 | <10 | <10 |
| 5 | 25° | <10 | ND | <10 | <10 | <10 | <10 | <10 | <10 |
| 10 | 25° | <10 | ND | <10 | <10 | <10 | <10 | <10 | <10 |
| 20 | 25° | <10 | ND | <10 | <10 | <10 | <10 | <10 | <10 |
| 30 | 25° | <10 | ND | <10 | <10 | <10 | <10 | <10 | <10 |
| 60 | 25° | <10 | ND | <10 | <10 | <10 | <10 | <10 | <10 |
| 90 | 25° | <10 | ND | <10 | <10 | <10 | <10 | <10 | <10 |
| 180 | 25° | <10 | ND | <10 | <10 | <10 | <10 | <10 | <10 |
| 0 | 4° | <10 | ND | <10 | <10 | <10 | <10 | <10 | <10 |
| 30 | 4° | <10 | ND | <10 | <10 | <10 | <10 | <10 | <10 |
| 60 | 4° | <10 | ND | <10 | <10 | <10 | <10 | <10 | <10 |
| 90 | 4° | <10 | ND | <10 | <10 | <10 | <10 | <10 | <10 |

EXAMPLE 3

A dairy-containing pourable shortening product in accordance with the present invention was prepared according to the following formulation:

87.748 weight percent soybean oil;
0.500 weight percent lecithin;
0.002 weight percent beta-carotene;
1.500 weight percent salt;
0.100 weight percent potassium sorbate;
5.00 weight percent water;
5.00 weight percent whole butter; and
0.150 weight percent flavors.

Samples of this formulation were inoculated in the same manner as specified in Example 1. The data are reported in Table V.

TABLE V

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| | 35° | 3,500,000 | 54,000 | 30 | 91,000 | 15,000 | 5,000 | 38,000 | 12,000 |
| 1 | 35° | <10 | <10 | <10 | 100,000 | 10 | 120 | <10 | 950 |
| 2 | 35° | 40 | <10 | <10 | 65,000 | <10 | <10 | <10 | 320 |
| 3 | 35° | <10 | <10 | <10 | 91,000 | <10 | 10 | <10 | 30 |
| 5 | 35° | <10 | <10 | <10 | 65,000 | <10 | <10 | <10 | <10 |
| 7 | 35° | <10 | <10 | <10 | 66,000 | <10 | <10 | <10 | <10 |
| 10 | 35° | <10 | <10 | <10 | 25,000 | <10 | <10 | <10 | <10 |

TABLE V-continued

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 0 | 25° | 3,500,000 | 54,000 | 30 | 91,000 | 15,000 | 5,000 | 38,000 | 12,000 |
| 3 | 25° | <10 | <10 | <10 | 86,000 | 10 | 50 | <10 | 4,000 |
| 5 | 25° | <10 | <10 | <10 | 88,000 | <10 | 10 | <10 | 470 |
| 10 | 25° | <10 | <10 | <10 | 110,000 | <10 | <10 | <10 | <10 |
| 20 | 25° | <10 | <10 | <10 | 49,000 | <10 | <10 | <10 | <10 |
| 30 | 25° | <10 | <10 | <10 | 43,000 | <10 | <10 | <10 | <10 |
| 60 | 25° | <10 | <10 | <10 | <10 | <10 | <10 | <10 | <10 |
| 90 | 25° | <10 | <10 | <10 | <10 | <10 | <10 | <10 | <10 |
| 180 | 25° | <10 | <10 | <10 | <10 | <10 | <10 | <10 | <10 |
| 0 | 4° | 3,500,000 | 54,000 | 30 | 91,000 | 15,000 | 5,000 | 38,000 | 12,000 |
| 30 | 4° | <10 | <10 | <10 | 100,000 | <10 | 10 | <10 | <10 |
| 60 | 4° | <10 | <10 | <10 | 90,000 | <10 | <10 | <10 | <10 |
| 90 | 4° | <10 | <10 | <10 | 36,000 | <10 | <10 | <10 | <10 |

Samples of the butter-containing pourable shortening formulation according to this Example 3 were segregated and were not inoculated with any microorganisms. Microorganisms detected over time are reported in Table VI.

TABLE VI

| | | Microorganisms Detected | | | | | | | |
|---|---|---|---|---|---|---|---|---|---|
| Storage Time (Days) | Temp. (°C.) | S. aureus (c/g) | Salmonella species (c/100 g) | E. coli (c/g) | Aerobic Plate Count (c/g) | C. perfringens (c/g) | B. cereus (c/g) | Yeasts (c/g) | Molds (c/g) |
| 0 | 35° | <10 | ND | <10 | <10 | <10 | <10 | <10 | <10 |
| 1 | 35° | <10 | ND | <10 | <10 | <10 | <10 | <10 | <10 |
| 2 | 35° | <10 | ND | <10 | <10 | <10 | <10 | <10 | <10 |
| 3 | 35° | <10 | ND | <10 | <10 | <10 | <10 | <10 | <10 |
| 5 | 35° | <10 | ND | <10 | <10 | <10 | <10 | <10 | <10 |
| 7 | 35° | <10 | ND | <10 | <10 | <10 | <10 | <10 | <10 |
| 10 | 35° | <10 | ND | <10 | <10 | <10 | <10 | <10 | <10 |
| 0 | 25° | <10 | ND | <10 | <10 | <10 | <10 | <10 | <10 |
| 3 | 25° | <10 | ND | <10 | <10 | <10 | <10 | <10 | <10 |
| 5 | 25° | <10 | ND | <10 | 40 | <10 | <10 | <10 | <10 |
| 10 | 25° | <10 | ND | <10 | <10 | <10 | <10 | <10 | <10 |
| 20 | 25° | <10 | ND | <10 | <10 | <10 | <10 | <10 | <10 |
| 30 | 25° | <10 | ND | <10 | <10 | <10 | <10 | <10 | <10 |
| 60 | 25° | <10 | ND | <10 | <10 | <10 | <10 | <10 | <10 |
| 90 | 25° | <10 | ND | <10 | <10 | <10 | <10 | <10 | <10 |
| 180 | 25° | <10 | ND | <10 | <10 | <10 | <10 | <10 | <10 |
| 0 | 4° | <10 | ND | <10 | <10 | <10 | <10 | <10 | <10 |
| 30 | 4° | <10 | ND | <10 | <10 | <10 | <10 | <10 | <10 |
| 60 | 4° | <10 | ND | <10 | <10 | <10 | <10 | <10 | <10 |
| 90 | 4° | <10 | ND | <10 | <10 | <10 | <10 | <10 | <10 |

EXAMPLE 4

A water phase component of the butter-containing pourable shortening composition of Example 3 was prepared by subjecting same to the treatment specified in Example 2 in order to simulate harsh handling conditions. Samples of these resulting aqueous or water phase products were inoculated in the same manner as specified in Example 1. The results thereof are specified in Table VII.

TABLE VII

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 0 | 35° | 68,000 | 3,200,000 | <10 | 130,000 | 900,000 | 3,000 | 27,000 | 25,000 |
| 1 | 35° | <10 | <10 | <10 | 63,000 | 100 | 390 | <10 | <10 |
| 2 | 35° | 10 | <10 | <10 | 45,000 | <10 | 50 | <10 | <10 |
| 3 | 35° | <10 | <10 | <10 | 83,000 | <10 | <10 | <10 | <10 |
| 5 | 35° | <10 | <10 | <10 | 70,000 | <10 | <10 | <10 | <10 |
| 7 | 35° | <10 | <10 | <10 | 66,000 | <10 | <10 | <10 | <10 |
| 10 | 35° | <10 | <10 | <10 | 35,000 | <10 | <10 | <10 | <10 |
| 0 | 25° | 68,000 | 3,200,000 | <10 | 130,000 | 900,000 | 3,000 | 27,000 | 25,000 |
| 3 | 25° | <10 | <10 | <10 | 71,000 | 20 | 190 | <10 | 130 |
| 5 | 25° | <10 | <10 | <10 | 67,000 | <10 | 20 | <10 | <10 |
| 10 | 25° | <10 | <10 | <10 | 79,000 | <10 | 10 | <10 | <10 |
| 20 | 25° | <10 | <10 | <10 | 68,000 | <10 | <10 | <10 | <10 |
| 30 | 25° | <10 | <10 | <10 | 95,000 | <10 | <10 | <10 | <10 |

TABLE VII-continued

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 60 | 25° | <10 | <10 | <10 | 1,500 | <10 | <10 | <10 | <10 |
| 90 | 25° | <10 | <10 | <10 | <10 | <10 | <10 | <10 | <10 |
| 180 | 25° | <10 | <10 | <10 | <10 | <10 | <10 | <10 | <10 |
| 0 | 4° | 68,000 | 3,200,000 | <10 | 130,000 | 900,000 | 3,000 | 27,000 | 25,000 |
| 30 | 4° | <10 | <10 | <10 | 63,000 | <10 | 80 | <10 | <10 |
| 90 | 4° | <10 | <10 | <10 | 130,000 | <10 | <10 | <10 | <10 |
| 180 | 4° | <10 | <10 | <10 | 320,000 (65,000 R) | <10 | <10 | <10 | <10 |

Samples of the water phase material of this Example 4 were segregated and not inoculated. Data were collected in the manner specified in accordance with the data of Table II in Example 1 herein. These data are reported in Table VIII.

TABLE VIII

| | | Microorganisms Detected | | | | | | | |
|---|---|---|---|---|---|---|---|---|---|
| Storage Time (Days) | Temp. (°C.) | S. aureus (c/g) | Salmonella species (c/100 g) | E. coli (c/g) | Aerobic Plate Count (c/g) | C. perfringens (c/g) | B. cereus (c/g) | Yeasts (c/g) | Molds (c/g) |
| 0 | 35° | <10 | ND | <10 | <10 | <10 | <10 | <10 | <10 |
| 1 | 35° | <10 | ND | <10 | <10 | <10 | <10 | <10 | <10 |
| 2 | 35° | <10 | ND | <10 | <10 | <10 | <10 | <10 | <10 |
| 3 | 35° | <10 | ND | <10 | <10 | <10 | <10 | <10 | <10 |
| 5 | 35° | <10 | ND | <10 | 10 | <10 | <10 | <10 | <10 |
| 7 | 35° | <10 | ND | <10 | <10 | <10 | <10 | <10 | <10 |
| 10 | 35° | <10 | ND | <10 | <10 | <10 | <10 | <10 | <10 |
| 0 | 25° | <10 | ND | <10 | <10 | <10 | <10 | <10 | <10 |
| 3 | 25° | <10 | ND | <10 | <10 | <10 | <10 | <10 | <10 |
| 5 | 25° | <10 | ND | <10 | <10 | <10 | <10 | <10 | <10 |
| 10 | 25° | <10 | ND | <10 | <10 | <10 | <10 | <10 | <10 |
| 20 | 25° | <10 | ND | <10 | <10 | <10 | <10 | <10 | <10 |
| 30 | 25° | <10 | ND | <10 | <10 | <10 | <10 | <10 | <10 |
| 60 | 25° | <10 | ND | <10 | <10 | <10 | <10 | <10 | <10 |
| 90 | 25° | <10 | ND | <10 | <10 | <10 | <10 | <10 | <10 |
| 180 | 25° | <10 | ND | <10 | <10 | <10 | <10 | <10 | <10 |
| 0 | 4° | <10 | ND | <10 | <10 | <10 | <10 | <10 | <10 |
| 30 | 4° | <10 | ND | <10 | <10 | <10 | <10 | <10 | <10 |
| 60 | 4° | <10 | ND | <10 | <10 | <10 | <10 | <10 | <10 |
| 90 | 4° | <10 | ND | <10 | <10 | <10 | <10 | <10 | <10 |

EXAMPLE 5

A butter containing pourable dairy shortening composition was prepared according to the following formulation:

82.748 weight percent of soybean oil base shortening;
0.500 weight percent lecithin;
0.002 weight percent beta-carotene;
1.500 weight percent salt;
0.100 weight percent potassium sorbate;
5.000 weight percent water;
10.000 weight percent butter; and
0.150 weight percent flavors.

Samples of this formulation were inoculated in the manner specified in Example 1. Data collected in this regard are reported in Table IX.

TABLE IX

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 0 | 35° | 4,300,000 | 100,000 | 20 | 140,000 | 10,000 | 6,000 | 62,000 | 10,000 |
| 1 | 35° | 50 | <10 | <10 | 110,000 | 110 | 440 | <10 | 1,000 |
| 2 | 35° | 20 | <10 | <10 | 82,000 | <10 | 20 | <10 | 250 |
| 3 | 35° | <10 | <10 | <10 | 88,000 | 20 | 10 | <10 | 40 |
| 5 | 35° | <10 | <10 | <10 | 100,000 | <10 | <10 | <10 | <10 |
| 7 | 35° | <10 | <10 | <10 | 83,000 | <10 | <10 | <10 | <10 |
| 10 | 35° | <10 | <10 | <10 | 77,000 | <10 | <10 | <10 | <10 |
| 0 | 25° | 4,300,000 | 100,000 | 20 | 140,000 | 10,000 | 6,000 | 62,000 | 10,000 |
| 3 | 25° | <10 | <10 | <10 | 77,000 | 90 | 130 | <10 | 60 |
| 5 | 25° | <10 | <10 | <10 | 97,000 | <10 | 20 | <10 | 50 |
| 10 | 25° | <10 | <10 | <10 | 130,000 | <10 | 10 | <10 | <10 |
| 20 | 25° | <10 | <10 | <10 | 54,000 | <10 | <10 | <10 | <10 |
| 30 | 25° | <10 | <10 | <10 | 65,000 | <10 | <10 | <10 | <10 |
| 60 | 25° | <10 | <10 | <10 | 1,700 | <10 | <10 | <10 | <10 |

TABLE IX-continued

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 90 | 25° | <10 | <10 | <10 | <10 | <10 | <10 | <10 | <10 |
| 180 | 25° | <10 | <10 | <10 | <10 | <10 | <10 | <10 | <10 |
| 0 | 4° | 4,300,000 | 100,000 | 20 | 140,000 | 10,000 | 6,000 | 62,000 | 10,000 |
| 30 | 4° | <10 | <10 | <10 | 80,000 | <10 | 40 | <10 | <10 |
| 90 | 4° | <10 | <10 | <10 | 120,000 | <10 | <10 | <10 | <10 |
| 180 | 4° | <10 | <10 | <10 | 150,000 (75,000 R) | <10 | <10 | <10 | <10 |

Samples of the dairy-component containing pourable shortening composition of this Example 5 were not inoculated, and data on microorganisms detected were collected. These data are reported in Table X.

TABLE X

| | | Microorganisms Detected | | | | | | | |
|---|---|---|---|---|---|---|---|---|---|
| Storage Time (Days) | Temp. (°C.) | S. aureus (c/g) | Salmonella species (c/100 g) | E. coli (c/g) | Aerobic Plate Count (c/g) | C. perfringens (c/g) | B. cereus (c/g) | Yeasts (c/g) | Molds (c/g) |
| 0 | 35° | <10 | ND | <10 | <10 | <10 | <10 | <10 | <10 |
| 1 | 35° | <10 | ND | <10 | <10 | <10 | <10 | <10 | <10 |
| 2 | 35° | <10 | ND | <10 | <10 | <10 | <10 | <10 | <10 |
| 3 | 35° | <10 | ND | <10 | <10 | <10 | <10 | <10 | <10 |
| 5 | 35° | <10 | ND | <10 | <10 | <10 | <10 | <10 | <10 |
| 7 | 35° | <10 | ND | <10 | 130 | <10 | <10 | <10 | <10 |
| 10 | 35° | <10 | ND | <10 | <10 | <10 | <10 | <10 | <10 |
| 0 | 25° | <10 | ND | <10 | <10 | <10 | <10 | <10 | <10 |
| 3 | 25° | <10 | ND | <10 | <10 | <10 | <10 | <10 | <10 |
| 5 | 25° | <10 | ND | <10 | 30 | <10 | <10 | <10 | <10 |
| 10 | 25° | <10 | ND | <10 | <10 | <10 | <10 | <10 | <10 |
| 20 | 25° | <10 | ND | <10 | <10 | <10 | <10 | <10 | <10 |
| 30 | 25° | <10 | ND | <10 | <10 | <10 | <10 | <10 | <10 |
| 60 | 25° | <10 | ND | <10 | <10 | <10 | <10 | <10 | <10 |
| 90 | 25° | <10 | ND | <10 | <10 | <10 | <10 | <10 | <10 |
| 180 | 25° | <10 | ND | <10 | <10 | <10 | <10 | <10 | <10 |
| 0 | 4° | <10 | ND | <10 | <10 | <10 | <10 | <10 | <10 |
| 30 | 4° | <10 | ND | <10 | <10 | <10 | <10 | <10 | <10 |
| 60 | 4° | <10 | ND | <10 | <10 | <10 | <10 | <10 | <10 |
| 90 | 4° | <10 | ND | <10 | <10 | <10 | <10 | <10 | <10 |

EXAMPLE 6

The butter-containing pourable shortening composition of Example 5 was subjected to the same simulated harsh treatment conditions that are detailed in Example 2. Samples of the resulting aqueous phase were inoculated as specified in Example 1. The resulting data are reported in Table XI.

TABLE XI

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 0 | 35° | 3,900,000 | 700,000 | 7,000 | 100,000 | 3,000,000 | 9,000 | 41,000 | 22,000 |
| 1 | 35° | 100,000 | <10 | <10 | 81,000 | 900 | 1,000 | <10 | <10 |
| 2 | 35° | 150 | <10 | <10 | 73,000 | 570 | 1,100 | <10 | 130 |
| 3 | 35° | <10 | <10 | <10 | 79,000 | 570 | 1,300 | <10 | <10 |
| 5 | 35° | <10 | <10 | <10 | 87,000 | <10 | 930 | <10 | <10 |
| 7 | 35° | <10 | <10 | <10 | 52,000 | 30 | 390 | <10 | <10 |
| 10 | 35° | <10 | <10 | <10 | 58,000 | <10 | 90 | <10 | <10 |
| 0 | 25° | 3,900,000 | 700,000 | 7,000 | 100,000 | 3,000,000 | 9,000 | 41,000 | 22,000 |
| 3 | 25° | 6,000 | <10 | <10 | 53,000 | <10 | 1,200 | <10 | 7,000 |
| 5 | 25° | <10 | <10 | <10 | 88,000 | <10 | 1,100 | <10 | 100 |
| 10 | 25° | <10 | <10 | <10 | 66,000 | 300 | 750 | <10 | <10 |
| 20 | 25° | <10 | <10 | <10 | 62,000 | <10 | <10 | <10 | <10 |
| 30 | 25° | <10 | <10 | <10 | 65,000 | <10 | 30 | <10 | <10 |
| 60 | 25° | <10 | <10 | <10 | 73,010 | <10 | <10 | <10 | <10 |
| 90 | 25° | <10 | <10 | <10 | 36,000 | <10 | <10 | <10 | <10 |
| 180 | 25° | <10 | <10 | <10 | <10 | <10 | <10 | <10 | <10 |
| 0 | 4° | 3,900,000 | 700,000 | 7,000 | 110,000 | 3,000,000 | 9,000 | 41,000 | 22,000 |
| 30 | 4° | <10 | <10 | <10 | 58,000 | <10 | 2,500 | <10 | <10 |
| 90 | 4° | <10 | <10 | <10 | 150,000 | <10 | 430 | <10 | <10 |

TABLE XI-continued

| | | Innoculants and Innoculation Counts | | | | | | | |
|---|---|---|---|---|---|---|---|---|---|
| Storage Time (Days) | Temp. (°C.) | S. aureus $10^7$ c/g (c/g) | Salmonella species $10^7$ c/100 g (c/100 g) | E. coli $10^5$ c/g (c/g) | Pseudo. species $10^5$ c/g (c/g) | C. perfringens $10^7$ c/g (c/g) | B. cereus $10^7$ c/g (c/g) | Yeasts $10^5$ c/g (c/g) | Molds $10^5$ c/g (c/g) |
| 180 | 4° | <10 | <10 | <10 | 240,000 )67,000 R) | <10 | <10 | <10 | <10 |

The aqueous phase material prepared in accordance with this Example 6 was divided into additional samples. These samples were not inoculated. Table XII reports data specifying microorganisms detected in these samples.

TABLE XII

| | | Microorganisms Detected | | | | | | |
|---|---|---|---|---|---|---|---|---|
| Storage Time (Days) | Temp. (°C.) | S. aureus (c/g) | Salmonella species (c/100 g) | E. coli (c/g) | Aerobic Plate Count (c/g) | C. perfringens (c/g) | B. cereus (c/g) | Yeasts (c/g) | Molds (c/g) |
| 0 | 35° | <10 | ND | <10 | <10 | <10 | <10 | <10 | <10 |
| 1 | 35° | <10 | ND | <10 | <10 | <10 | <10 | <10 | <10 |
| 2 | 35° | <10 | ND | <10 | <10 | <10 | <10 | <10 | <10 |
| 3 | 35° | <10 | ND | <10 | <10 | <10 | <10 | <10 | <10 |
| 5 | 35° | <10 | ND | <10 | 20 | <10 | <10 | <10 | <10 |
| 7 | 35° | <10 | ND | <10 | 120 | <10 | <10 | <10 | <10 |
| 10 | 35° | <10 | ND | <10 | <10 | <10 | <10 | <10 | <10 |
| 0 | 25° | <10 | ND | <10 | <10 | <10 | <10 | <10 | <10 |
| 3 | 25° | <10 | ND | <10 | <10 | <10 | <10 | <10 | <10 |
| 5 | 25° | <10 | ND | <10 | <10 | <10 | <10 | <10 | <10 |
| 10 | 25° | <10 | ND | <10 | <10 | <10 | <10 | <10 | <10 |
| 20 | 25° | <10 | ND | <10 | <10 | <10 | <10 | <10 | <10 |
| 30 | 25° | <10 | ND | <10 | <10 | <10 | <10 | <10 | <10 |
| 60 | 25° | <10 | ND | <10 | 230 | <10 | <10 | <10 | <10 |
| 90 | 25° | <10 | ND | <10 | <10 | <10 | <10 | <10 | <10 |
| 180 | 25° | <10 | ND | <10 | <10 | <10 | <10 | <10 | <10 |
| 0 | 4° | <10 | ND | <10 | <10 | <10 | <10 | <10 | <10 |
| 30 | 4° | <10 | ND | <10 | <10 | <10 | <10 | <10 | <10 |
| 60 | 4° | <10 | ND | <10 | <10 | <10 | <10 | <10 | <10 |
| 90 | 4° | <10 | ND | <10 | <10 | <10 | <10 | <10 | <10 |

EXAMPLE 7

A butter-containing pourable shortening product was prepared according to the following formulation:
82.884 weight percent of a base shortening including soybean oil and including soy flake;
0.500 weight percent lecithin;
0.005 weight percent beta-carotene;
1.500 weight percent salt;
0.100 weight percent potassium sorbate;
5.000 weight percent water;
10.000 weight percent butter; and
0.011 weight percent flavors.

Samples of this product were stored in open containers at 25° C. for 30 days without inoculation. The results are reported in Table XIII.

TABLE XIII

| | Microorganisms Detected | | | | | | |
|---|---|---|---|---|---|---|---|
| Storage Time (Days) | Aerobic Plate Count (c/g) | E. coli (c/g) | C. perfringens (c/g) | S. Aereus (c/g) | Salmonella species (c/g) | B. cereus (c/g) | Yeasts and Molds (c/g) |
| 0 | <10 | <10 | <10 | <10 | <10 | <10 | <10 |
| 5 | <10 | <10 | <10 | <10 | — | <10 | <10 |
| 15 | <10 | <10 | <10 | <10 | — | <10 | <10 |
| 30 | <10 | <10 | <10 | <10 | — | <10 | <10 |

Samples of this butter-containing pourable shortening product in accordance with this Example 7 were inoculated generally in accordance with the procedure specified in Example 1 with four of the microorganisms specified in that Example. Each was stored at 25° C. Certain of the samples were stored in open containers, while others were stored in covered or closed containers. The collected data are specified in Table XIV.

TABLE XIV

| | | Innoculants and Innoculation Counts | | | |
|---|---|---|---|---|---|
| Storage Time (Days) | Storage | S. aureus $10^7$ c/g (c/g) | B. cereus $10^7$ c/g (c/g) | Yeasts $10^5$ c/g (c/g) | Molds $10^5$ c/g (c/g) |
| 0 | OPEN | 5,800 | 9,900 | 3,300 | 4,200 |
| 5 | OPEN | <10 | <10 | 5 | 170 |
| 15 | OPEN | <10 | <10 | <10 | 150 |
| 30 | OPEN | <10 | <10 | <10 | 130 |
| 0 | CLOSED | 6,800 | 15,700 | 4,200 | 7,000 |
| 5 | CLOSED | <10 | <10 | <10 | 260 |
| 15 | CLOSED | <10 | <10 | <10 | 70 |
| 30 | CLOSED | <10 | <10 | <10 | 160 |

EXAMPLE 8

Another butter-containing formulation was prepared as follows:
80.874 weight percent soybean oil base shortening;
0.500 weight percent lecithin;
0.005 weight percent beta-carotene;
1.275 weight percent salt;
0.085 weight percent potassium sorbate;
5.750 weight percent water;
11.500 weight percent butter; and
0.011 weight percent flavors.

Samples of this product were stored in open containers at 25° C. The samples were not inoculated. Detected microorganisms are reported in Table XV.

TABLE XV

| Storage Time (Days) | Microorganisms Detected | | | | | | |
|---|---|---|---|---|---|---|---|
| | Aerobic Plate Count (c/g) | E. coli (c/g) | C. per- fringens (c/g) | S. aereus (c/g) | Salmonella species (c/g) | B. cereus (c/g) | Yeasts and Molds (c/g) |
| 0 | <10 | <10 | <10 | <10 | <10 | <10 | <10 each |
| 5 | <10 | <10 | <10 | <10 | — | <10 | <10 each |
| 15 | <10 | <10 | <10 | <10 | — | <10 | <10 |
| 30 | <10 | <10 | <10 | <10 | — | <10 | <10 |

Other samples of this Example 8 product were inoculated with four inoculants in the manner specified in Example 1. One group of these samples was stored in open containers for 30 days, and another group was stored in closed containers for 30 days, all being maintained at 25° C. The results are reported in Table XVI.

TABLE XVI

| Storage Time (Days) | Storage | Innoculants and Innoculation Counts | | | |
|---|---|---|---|---|---|
| | | S. aureus $10^7$ c/g (c/g) | B. cereus $10^7$ c/g (c/g) | Yeasts $10^5$ c/g (c/g) | Molds $10^5$ c/g (c/g) |
| 0 | OPEN | 7,800 | 12,500 | 3,700 | 5,000 |
| 5 | OPEN | <10 | <10 | 65 | 3,200 |
| 15 | OPEN | <10 | <10 | <10 | 190 |
| 30 | OPEN | <10 | <10 | <10 | 180 |
| 0 | CLOSED | 8,100 | 10,000 | 3,500 | 4,100 |
| 5 | CLOSED | <10 | <10 | <10 | 140 |
| 15 | CLOSED | <10 | <10 | <10 | 95 |
| 30 | CLOSED | <10 | <10 | <10 | 260 |

EXAMPLE 9

The butter-containing formulation specified in Example 8 was subjected to the treatment specified in Example 2 in order to simulate extremely harsh handling conditions. The result is a so-called aqueous phase. Samples of this aqueous phase were stored in closed containers for 30 days. They were not inoculated. Microorganisms detected are reported in Table XVII.

TABLE XVII

| Storage Time (Days) | Temp. (°C.) | Microorganisms Detected | | | | | | |
|---|---|---|---|---|---|---|---|---|
| | | Aerobic Plate Count (c/g) | E. coli (c/g) | C. per- fringens (c/g) | S. aereus (c/g) | Salmonella species (c/g) | B. cereus (c/g) | Yeasts and Molds (c/g) |
| 0 | 25° | <10 | <10 | <10 | <10 | <10 | <10 | <10 |
| 5 | 25° | <10 | <10 | <10 | <10 | — | <10 | <10 |
| 15 | 25° | <10 | <10 | <10 | <10 | — | <10 | <10 |
| 30 | 25° | <10 | <10 | <10 | <10 | — | <10 | <10 |
| 0 | 4° | <10 | <10 | <10 | <10 | <10 | — | <10 |
| 30 | 4° | <10 | <10 | <10 | <10 | <10 | — | <10 |

Samples of the aqueous phase material of this Example 9 were inoculated and stored closed at 25° C. for 30 days. Data collected in this regard are reported in Table XVIII.

TABLE XVIII

| Storage Time (Days) | Innoculants and Innoculation Counts | | | |
|---|---|---|---|---|
| | S. aureus $10^7$ c/g (c/g) | B. cereus $10^7$ c/g (c/g) | Yeasts $10^5$ c/g (c/g) | Molds $10^5$ c/g (c/g) |
| 0 | 15,000 | 11,000 | 4,900 | 5,700 |
| 5 | <10 | <10 | <10 | 2,300 |
| 15 | <10 | <10 | <10 | <10 |
| 30 | <10 | <10 | <10 | <10 |

Samples of the aqueous phase product of this Example 9 were inoculated with *Pseudomonas aeruginosa*. One sample was stored at 4° C. The count at the beginning of this storage time was 100,000 c/g. After storage for one month, the count was <10 c/g. Another sample of this inoculated aqueous phase material was stored at 25° C. The initial count was 99,000 c/g. After storage for one month, the count was below detectable levels, at <10 c/g.

It will be understood that the embodiments of the present invention which have been described are illustrative of some of the applications of the principles of the present invention. Numerous modifications may be made by those skilled in the art without departing from the true spirit and scope of the invention.

I claim:

1. A ready-to-use shelf-stable shortening composition that contains a butter component, the shortening composition comprising:
    at least about 70 weight percent, based upon the total weight of the composition, of an edible liquid shortening base component;
    in excess of about 1 weight percent, based upon the total weight of the shortening composition, of a butter component, wherein said butter component is selected from the group consisting of whole butter, butter substitutes including dairy ingredients, and mixtures thereof;

a water component in an amount less than approximately 10 weight percent, based upon the total weight of the shortening composition;

a salt component present at a level which is in excess of its saturation level in the water component at ambient temperature; and said shortening composition is microbiologically stable at ambient, non-refrigerated temperatures as well as at refrigerated temperatures.

2. The shortening composition according to claim 1, wherein the shortening composition is pourable at least at room temperatures.

3. The shortening composition according to claim 1, wherein said edible liquid shortening base component is a pourable vegetable oil component and an edible solids component.

4. The shortening composition according to claim 1, wherein said butter component is whole, real butter present in the shortening composition in an amount up to about 20 weight percent, based upon the total weight of the shortening composition.

5. The shortening composition according to claim 1, wherein said edible liquid shortening base component is present at between about 75 and about 95 weight percent, said butter component is present at between about 5 and about 15 weight percent, said water component is present at between about 2 and about 8 weight percent, and said salt component is present at between about 0.15 and about 4 weight percent, all based upon the total weight of the shortening composition.

6. The shortening composition according to claim 1, wherein the shortening composition has an available water level of between approximately 0.56 and 0.85.

7. The shortening composition according to claim 1, wherein said edible liquid shortening base component is present at between about 78 and about 88 weight percent.

8. The shortening composition according to claim 1, wherein said butter component is present at between about 7 and about 12 weight percent, based upon the total weight of the shortening composition.

9. The shortening composition according to claim 1, wherein said water component is present at between about 4 and about 6 weight percent, based upon the total weight of the shortening composition.

10. The shortening composition according to claim 1, wherein the shortening composition has an available water level of between approximately 0.6 and 0.8.

11. The shortening composition according to claim 1, wherein the shortening composition has an available water level of between approximately 0.68 and approximately 0.76.

12. The shortening composition according to claim 1, wherein the shortening composition has a pH of between about 5 and about 6.8.

13. The shortening composition according to claim 1, wherein the shortening composition is formulated so as to be microbially stable at 25° C. and above.

* * * * *

UNITED STATES PATENT AND TRADEMARK OFFICE
CERTIFICATE OF CORRECTION

PATENT NO.  : 4,960,606
DATED       : October 2, 1990
INVENTOR(S) : Thomas G. Crosby It is certified that error appears in the above-identified patent and that said Letters Patent is hereby corrected as shown below:

On the title page:
    Under "OTHER PUBLICATIONS", line 10, "Emulsins"," should read
--Emulsions",--.
    Col. 6, line 37, insert --in-- before "Table".
    Col. 17, lines 8 and 9, ")67,000 R)" should read --(67,000 R)--.

Signed and Sealed this

Sixth Day of April, 1993

Attest:

STEPHEN G. KUNIN

*Attesting Officer*     *Acting Commissioner of Patents and Trademarks*